United States Patent [19]

Sawai

[11] Patent Number: 5,114,176
[45] Date of Patent: May 19, 1992

[54] SUSPENSION MECHANISM FOR VEHICLES

[75] Inventor: Seiji Sawai, Iwata, Japan

[73] Assignee: Yamaha Hatsudoki Kabushiki Kaisha, Iwata, Japan

[21] Appl. No.: 638,678

[22] Filed: Jan. 8, 1991

[30] Foreign Application Priority Data

Jan. 9, 1990 [JP] Japan .................................. 2-1062
Aug. 31, 1990 [JP] Japan ................................ 2-228418

[51] Int. Cl.⁵ ................................................ B60G 3/18
[52] U.S. Cl. ................................... 280/691; 280/673; 280/674; 280/675
[58] Field of Search .............. 280/690, 691, 696, 701, 280/693, 698, 663, 673, 674, 675, 667, 688

[56] References Cited

U.S. PATENT DOCUMENTS 4,753,455  6/1988  Murakami et al. ............... 280/675

FOREIGN PATENT DOCUMENTS 969002  9/1964  United Kingdom ............... 280/675

Primary Examiner—Charles A. Marmor
Assistant Examiner—Karin Tyson
Attorney, Agent, or Firm—Ernest A. Beutler

[57] ABSTRACT

A number of embodiments of suspensions for steered wheels of a vehicle embodying upper and lower suspension arms with the upper arm connected to the vehicle by a ball joint so that the steering of the wheel is accommodated by pivotal movement of the upper arm. This arrangement reduces tread changes during suspension and steering movement. A wide variety of locations and orientations of the upper and lower arms and loading for the suspension units are disclosed.

33 Claims, 19 Drawing Sheets

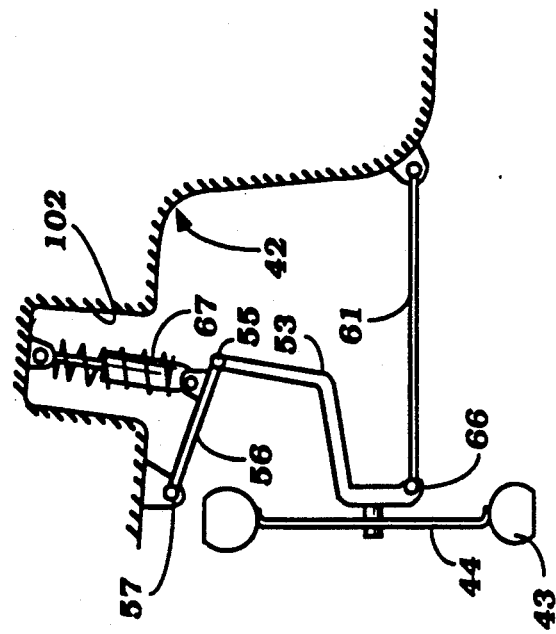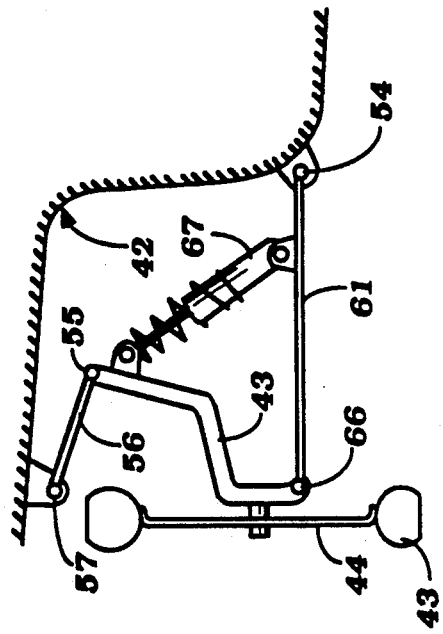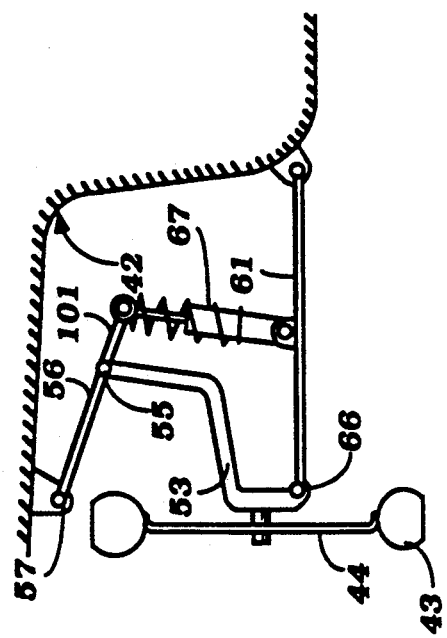

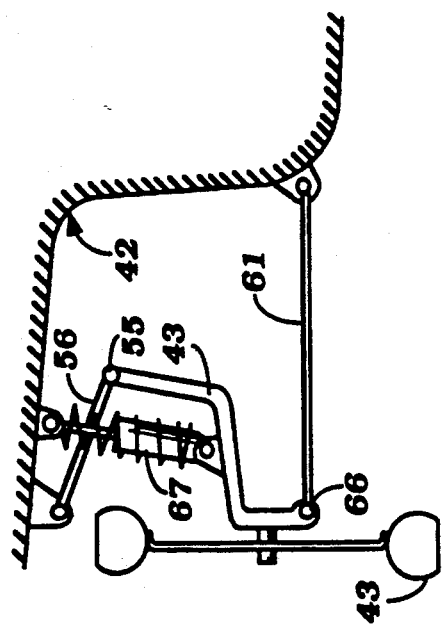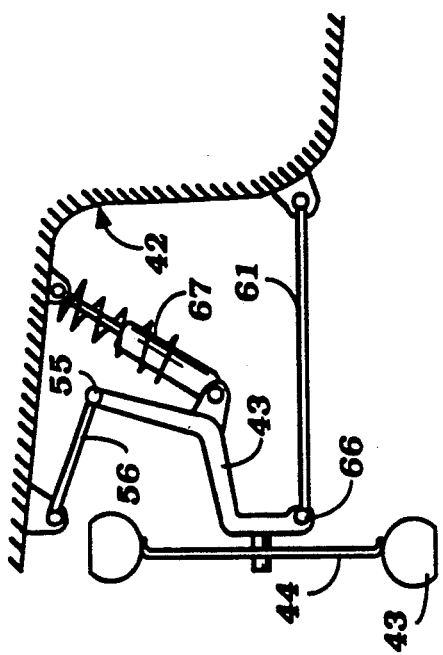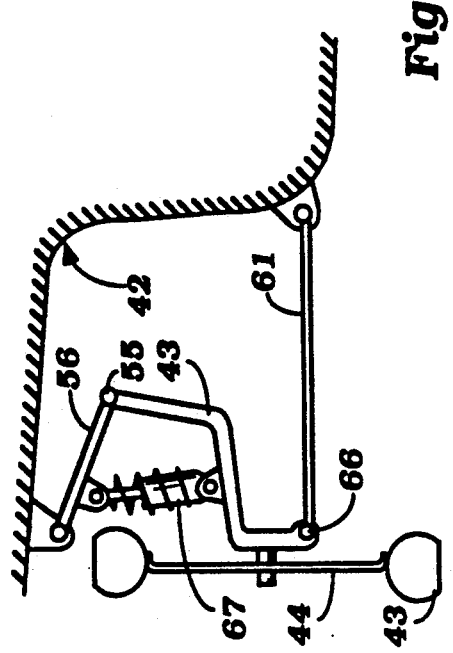

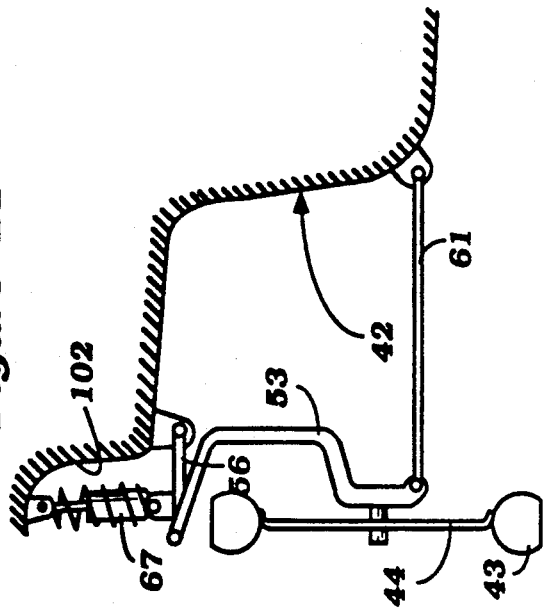
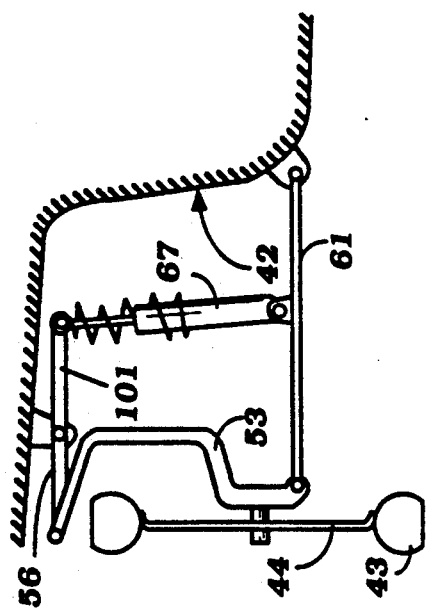
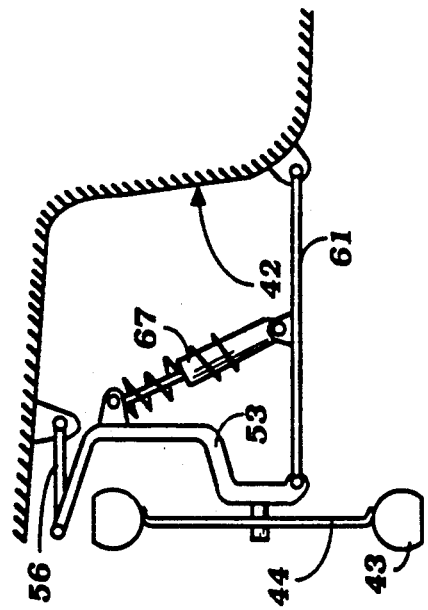

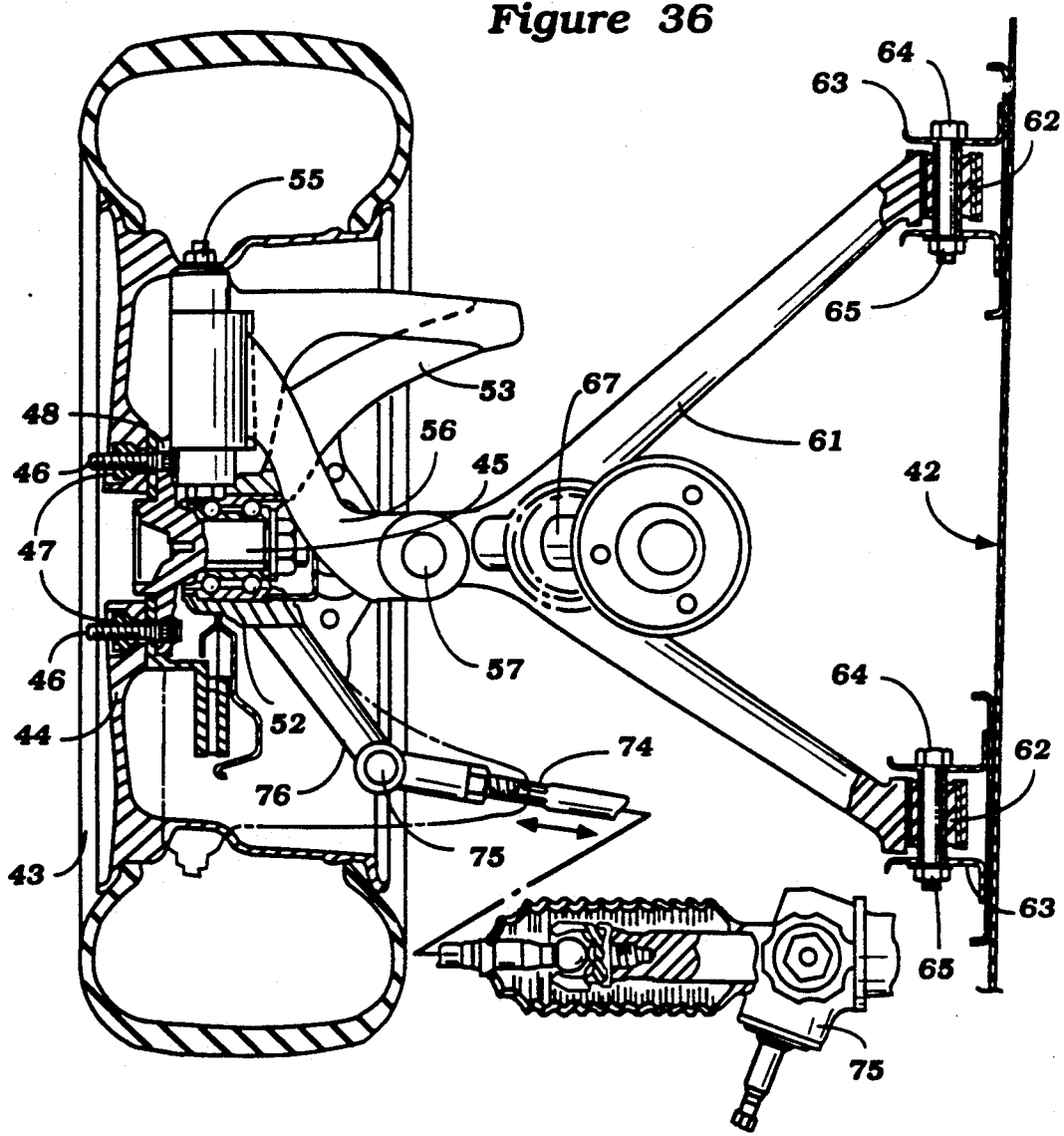
Figure 36
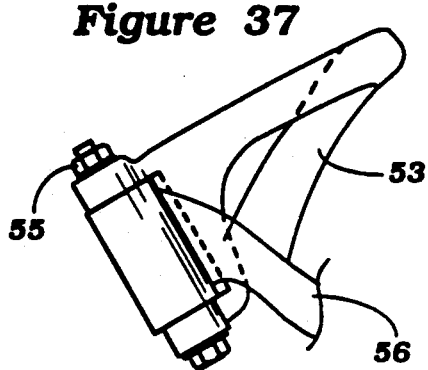
Figure 37
Figure 38

SUSPENSION MECHANISM FOR VEHICLES

BACKGROUND OF THE INVENTION

This invention relates to a suspension mechanism for vehicles and more particularly to an improved independent suspension system for a steered wheel of a vehicle.

A wide variety of suspension systems have been proposed for motor vehicles. One of the most commonly used type of suspension system employs a double wishbone type of construction having a upper and lower wishbone shaped suspension arms that have spaced apart pivot points to the vehicle frame and/or body and which carry an axle carrier at their outer end on which the wheel is suspended. Equal or unequal length wishbones are employed for this purpose. However, when the wheel is steered as in the case of a front wheel, then this type of suspension system presents certain difficulties in that the contact patch between the wheel and the ground varies in response to both suspension travel and steering angle. As a result, the traction on the steering wheel can degrade in response to variations in either position.

Also, the use of the spaced apart suspension points of each of the suspension arms on the body and/or frame gives rise to problems in connection to location and alignment.

It is, therefore, a principal object to this invention to provide an improved suspension system for a vehicle wheel and particularly a steered vehicle wheel.

It is a further object to this invention to provide an improved suspension system for a steered wheel that employs a pair of suspension arms but wherein the contact patch between the tire and ground is not significantly changed during suspension travel or steering movement.

It is a further object to this invention to provide a suspension system for a steered wheel in which the contact patch between the wheel and the ground is maintained substantially uniform during all movements of the wheel.

It is a further object to this invention to provide an improved suspension system for a vehicle wheel that is simple in operation and highly affective.

SUMMARY OF THE INVENTION

This invention is adapted to be embodied in a suspension system for the dirigible wheel of a motor vehicle that comprises an axle carrier for rotatably supporting a wheel about an axis. An upper arm has a pivotal connection to the axle carrier at one of its end and first ball joint means connect the other end of the upper arm to the vehicle for pivotal suspension movement of the upper arm and for steering movement of the upper arm about a generally vertical extending steering axis. A lower arm is pivotally connected to the vehicle for suspension movement at one end and is connected by a second ball joint to the axle carrier at its other end for steering movement of the axle carrier relative to the lower arm.

BRIEF DESCRIPTION OF THE DRAWINGS

FIG. 9 is a schematic view, in part similar to FIG. 7, and shown yet another embodiment of the invention.

FIG. 10 is a schematic view, in part similar to FIG. 9, and shows a further embodiment of the invention.

FIG. 11 is a schematic view, in part similar to FIGS. 9 and 10, and shows a still further embodiment of the invention.

FIG. 15 is a schematic view, in part similar to FIGS. 9 through 14, and shows another embodiment.

FIG. 16 is a schematic view, in part similar to FIGS. 9 through 15, showing yet another embodiment of the invention.

FIG. 17 is a further schematic view of yet another embodiment of the invention, in part similar to FIGS. 9 through 16.

FIG. 20 is a schematic view, in part similar to FIG. 18, showing another embodiment of the invention.

FIG. 21 is a schematic view, in part similar to FIG. 20, showing yet another embodiment of the invention.

FIG. 22 is a schematic view, in part similar to FIGS. 20 and 21, showing a further embodiment of the invention.

FIG. 36 is top plan view, in part similar to FIG. 19, and shows yet another, embodiment of the invention.

FIG. 37 is a partial view, in part similar to FIG. 36, showing yet another embodiment of the invention.

FIG. 38 is a partial view, in part similar to FIG. 36 and 37, and shows yet further embodiment of the invention.

DETAILED DESCRIPTION OF THE PREFERRED EMBODIMENTS OF THE INVENTION

Figure 1:
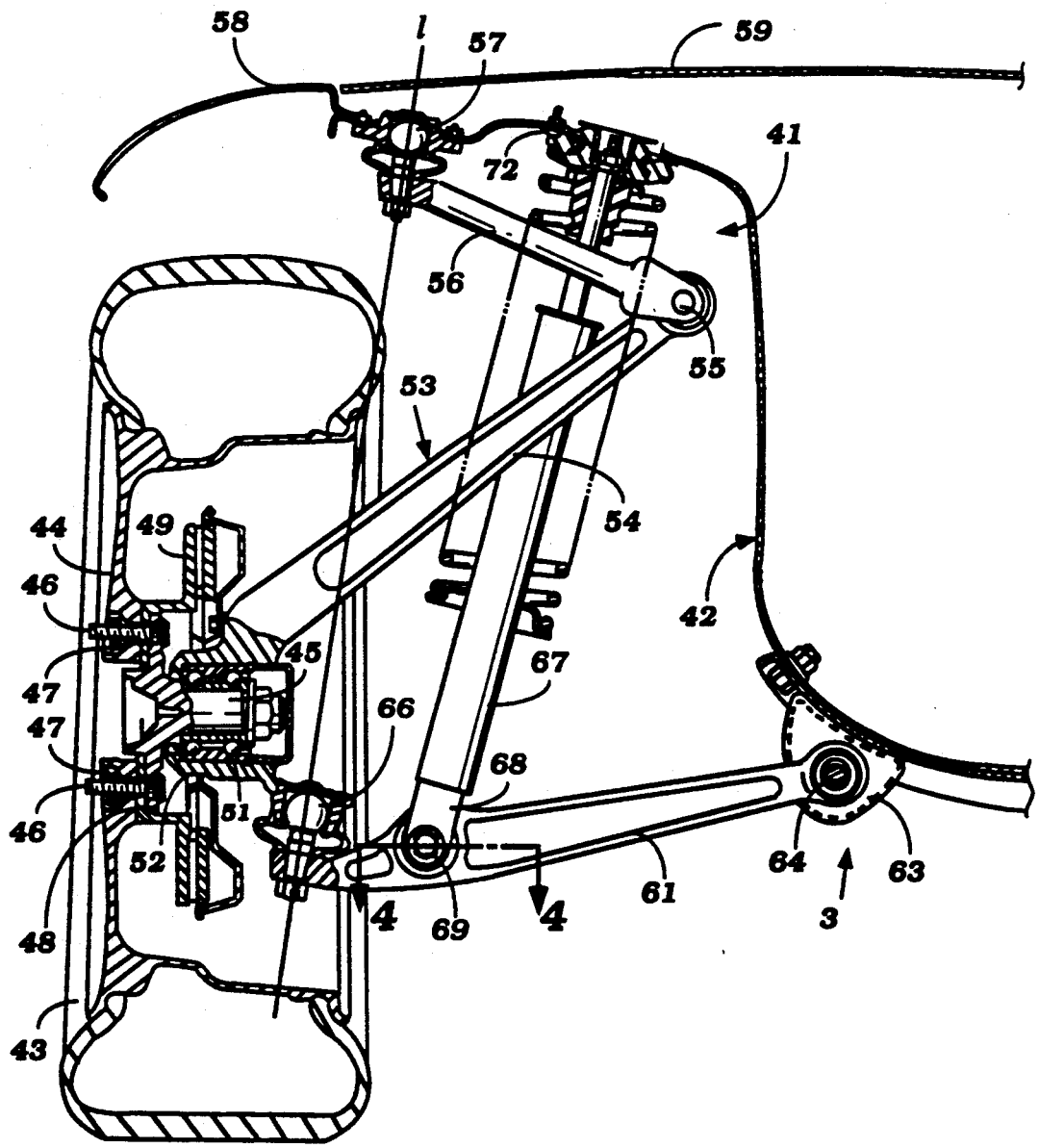
FIG. 1 is a cross sectional view taken along a generally vertically extending plane through one wheel of a motor vehicle having a suspension system constructed in accordance with an embodiment of the invention.
Figure 2:
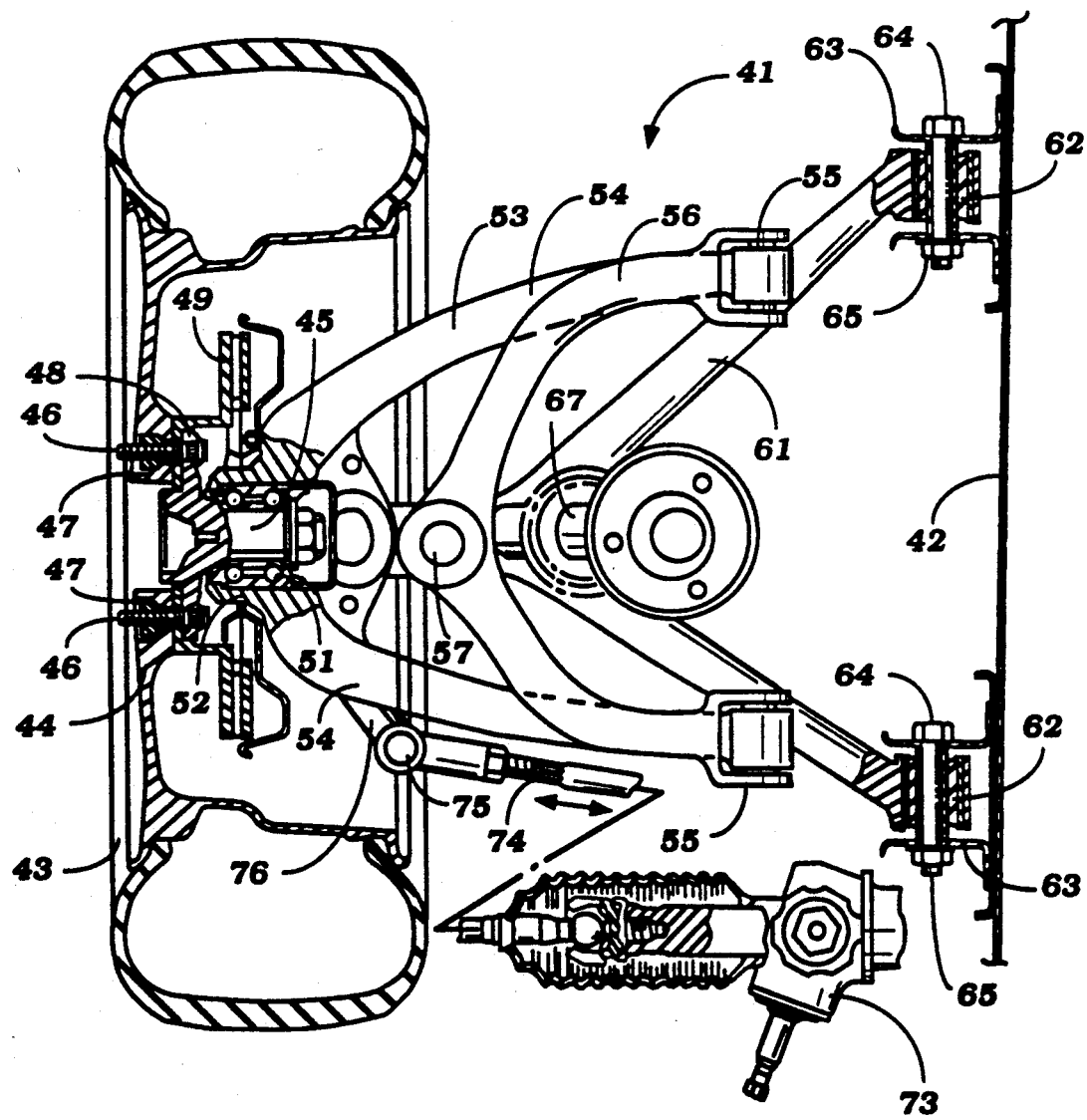
FIG. 2 is a top plan view with portions shown in section, of the suspension system.
Figure 3:
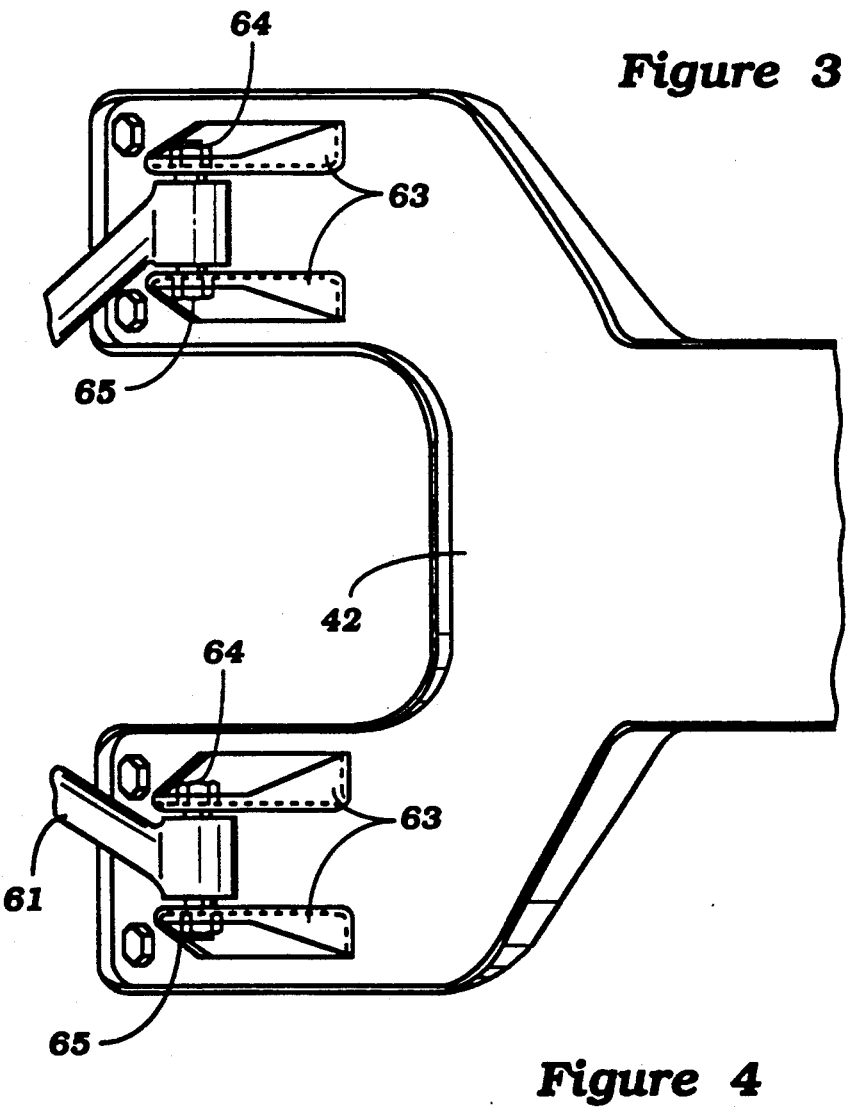
FIG. 3 is a view looking generally in the direction of the arrow 3 in the FIG. 1 and shows the pivotal connection between the lower suspension arm and the vehicle.
Figure 4:
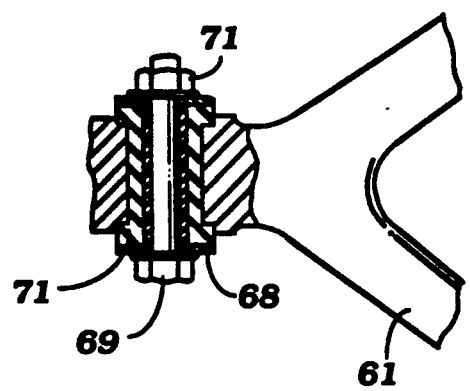
FIG. 4 is a cross sectional view taken along the line 4—4 of FIG. 1 and shows the connection between the lower arm and the suspension element.

Referring first in detail to FIGS. 1 through 4 and the embodiment thereof, a front wheel suspension for a motor vehicle is identified generally by the reference numeral 41. In each of the embodiments illustrated and described, the wheel suspension is that of the left front wheel of a motor vehicle which wheel is steered. This is because the invention has particular utility with the independent suspension for the steered front wheels of a motor vehicle. It is to be understood, however, that the invention may be utilized in conjunction with independent rear wheel suspensions and has particular utility where such rear wheels are also steered. The invention can also be utilized in conjunction with non-steered wheels.

The vehicle with which the suspension 41 is associated is shown partially and is identified by the reference numeral 42. In the illustrated embodiment, the vehicle 42 has a unitized construction and thus has no separate frame. It should be readily apparent to those skilled in the art how the invention can be employed in conjunction with frame type vehicles.

A front tire 43 is mounted in a known manner on a front wheel 44. The wheel 44 is, in turn, affixed to a front axle 45 by means of studs 46 and nuts 47 in a known manner. The studs 46 are pressed into a flange 48 of the axle 45 and also affixed a front brake rotor 49 for rotation with the front wheel 44. A disc brake assembly (not shown) is operative with the brake rotor 49 for braking the front wheel 44 and tire 43.

The axle 45 is journaled by means of an anti-friction bearing 51 in a hub portion 52 of an axle carrier, indicated generally by the reference numeral 53. In this embodiment, the axle carrier 53 has a bifurcated upper portion consisting of inwardly extending arms 54 that are pivotally connected by means of pin type joints 55 to a pair of inwardly facing arm sections of a Y-shape upper arm 56. In this embodiment, the pivotal connection formed by the joints 55 extends substantially parallel to the longitudinal axis of the motor vehicle and specifically its body 42 when the wheel 44 and tire 43 are in their straight ahead positions.

The upper arm 56 is connected by means of a ball joint 57 to the body 53 and specifically an upper portion of the fender apron 58 thereof. This is adjacent the hood 59 of the vehicle body. The ball joint 57 permits the upper arm 56 to pivot about a axis that is parallel to the longitudinal center line of the vehicle for suspension movement and also to rotate about an axis 1 for steering movement, in a manner to be described.

A generally Y-shaped lower arm 61 has a bifurcated end which has trunnions or bushings 62 which are pivotally supported within a pair of brackets 63 affixed to the body 42 by means of pivot bolts 64 and nuts 65. These pivot axes are parallel to the pivot axis 55 of the upper arm 53 when the front wheel 44 and tire 43 are in their straight ahead positions.

A ball joint 66 is carried at the outer end of the lower arm 61 and provides a universal pivot connection to the axle carrier 53. The ball joint 66 is aligned along the axis 1 with the ball joint 57 so as to provide a generally vertically extending steering axis of the front wheel 44 and tire 43.

The suspension movement of the front wheel 44 and tire 43 is controlled by a strut type combined shock absorber and spring assembly, generally indicated by the reference numeral 67 and hereinafter referred to as a "suspension element". The housing assembly 68 of this suspension unit is pivotally connected by means of a pivot bolt 69 and nut 71 through an intermediate bushings 71 to the lower arm 61. The upper end and specifically the piston rod of the suspension unit is connected to the fender apron 58 by a mounting assembly 72. As a result, suspension movement of the front wheel will be dampened by the suspension unit 67.

A steering gear box 73 (FIG. 2) is carried by the vehicle body 42 and may be of the rack and pinion type which controls a steering link 74 that is connected by a pivotal connection 75 to a steering arm 76 formed integrally the axle carrier 53 for the steering movement of the front wheel 44 and front tire 43.

Because of the aforedescribed construction, there will be minimum changes in tread contact between the tire 43 and the ground regardless of the degree of suspension travel or the steering position of the front wheel 44 and tire 43. As a result, good handling can be accommodated.

Figure 5:
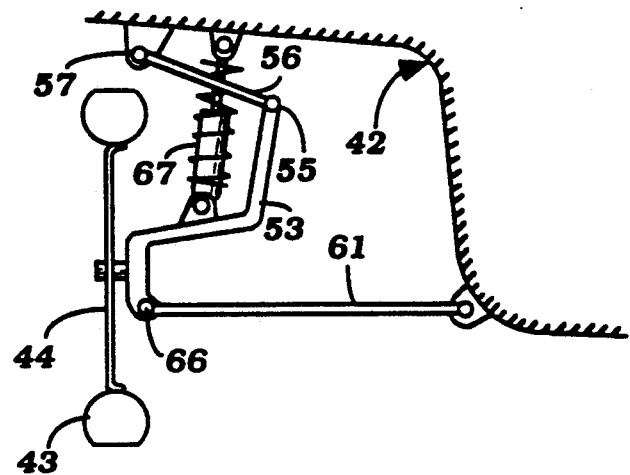
FIG. 5 is a partially schematic elevational view looking in the same direction as FIG. 1 and shows another embodiment of the invention.
Figure 6:
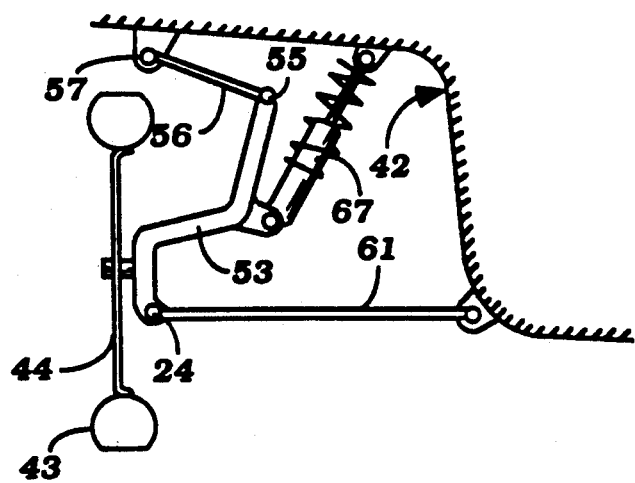
FIG. 6 is a schematic view, in part similar to FIG. 5, and shows another embodiment of the invention.

In the embodiment of FIGS. 1 through 4, the suspension unit 67 was loaded between the lower arm 61 and the body 42 with the point of loading being spaced inboard from the ball joint 57 of the upper arm 56 and outboard of the pivotal connection 55 between the upper arm 56 and the axle carrier 54. Other locations for the suspension unit are possible and FIGS. 5 and 6 show such other locations. In view of the fact that the front wheel suspension system is substantially the same as previously described and only the location of the suspension unit 67 and its loading differs, only schematic views are believed to be necessary in order to show these differences.

In FIG. 5, the suspension unit 67 is mounted between the axle carrier 53 and the body 42 with the point of attachment being located between the ball joint 57 and the pivotal connection 55 between the axle carrier 53 and the upper arm 56. In all other regards, this embodiment is the same as those previously described and, for that reason, further description is not believed to be necessary.

In the embodiments of FIGS. 1 through 4 and of FIG. 5 the suspension unit 67 has its line of action disposed substantially parallel to the steering axis 1. FIG. 6 shows another embodiment which is similar to the embodiment of FIG. 5 but wherein the suspension unit 67 is connected to the axle carrier 53 on its inboard side and is pivotally connected to the body 42 inboard of both of the pivotal connections 57 and 55 of the upper arm 56.

Figure 7:
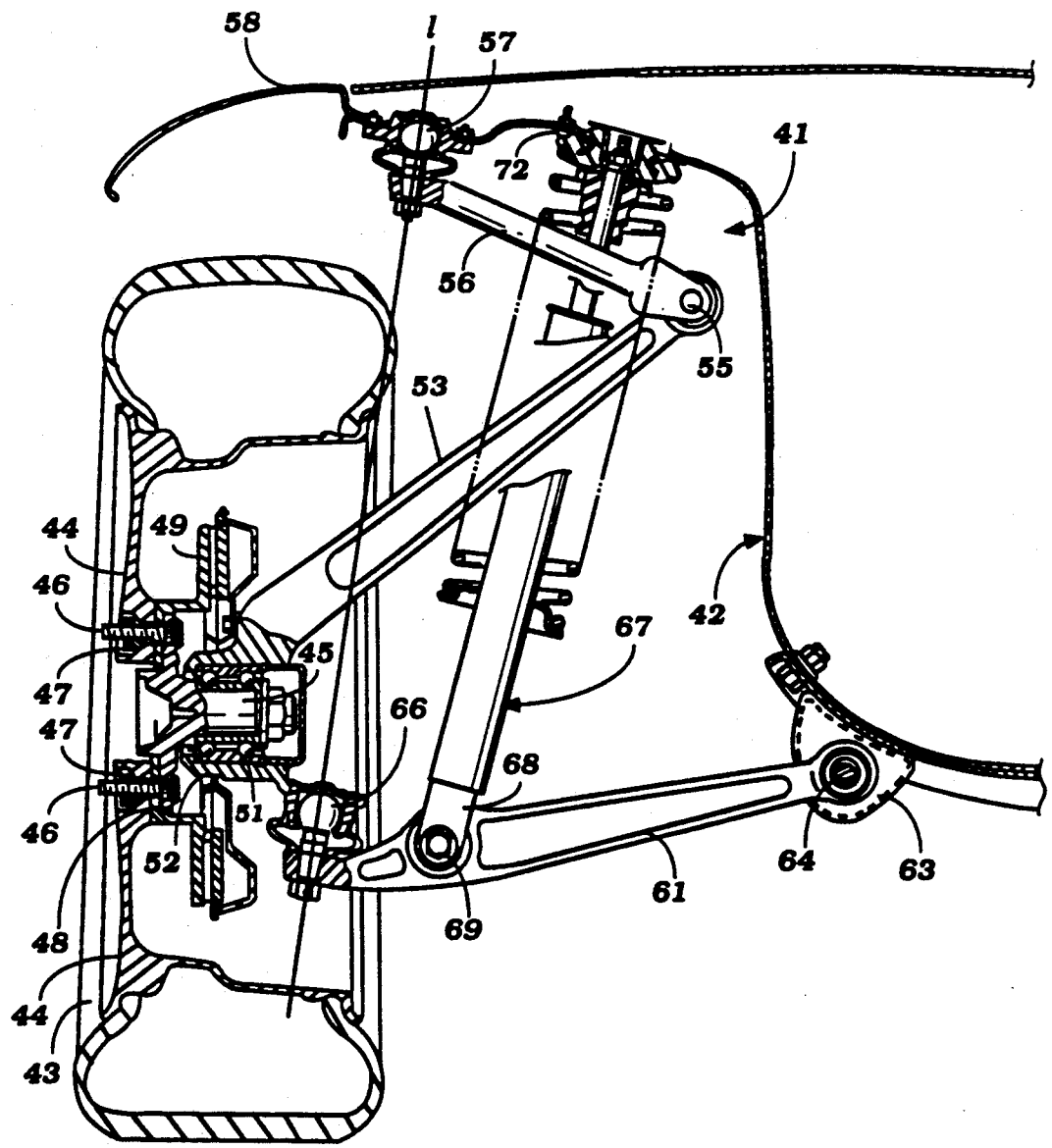
FIG. 7 is a cross sectional view, in part similar to FIG. 1, and shows a further embodiment of the invention.
Figure 8:
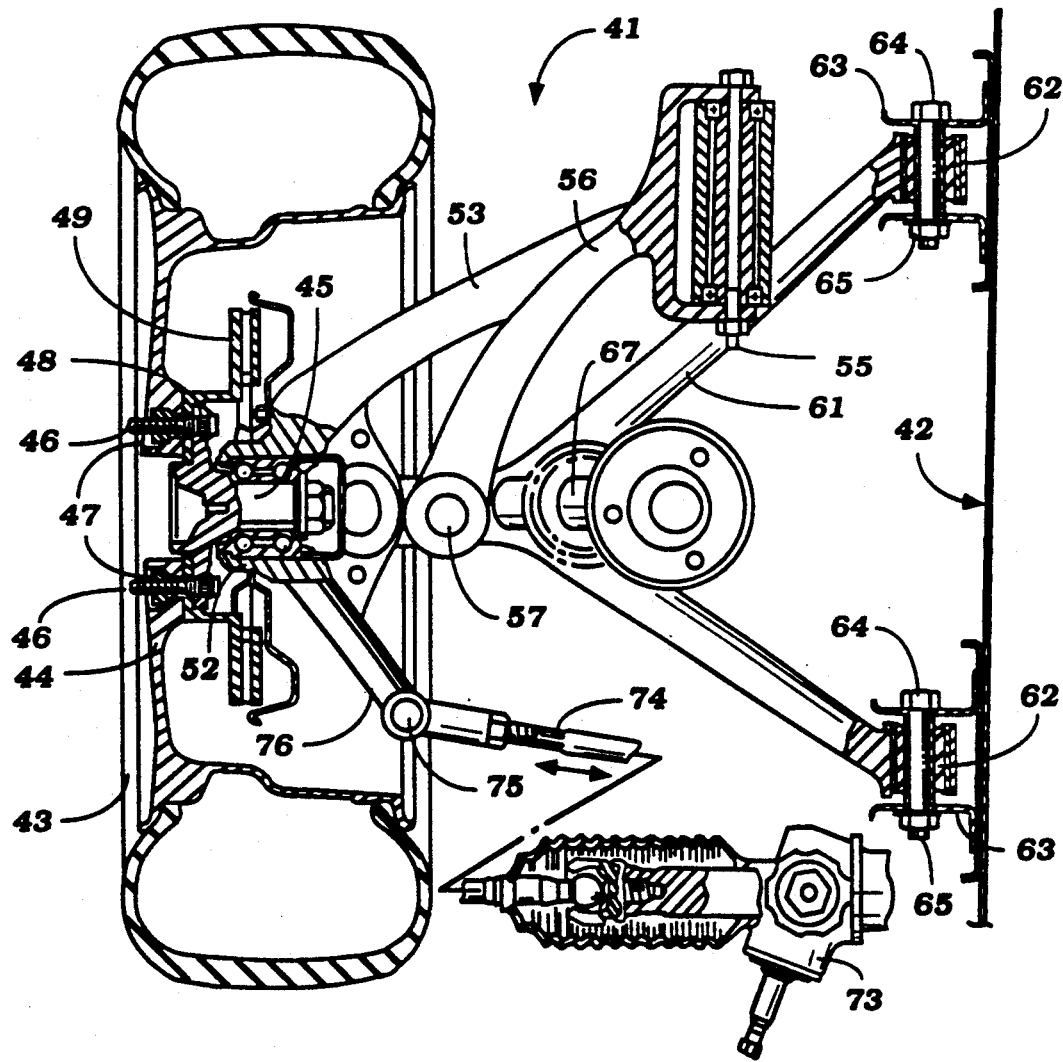
FIG. 8 is a top plan view, with portions broken away, of the embodiment of FIG. 7.

In the embodiments of the invention as thus far described, the upper arm 56 has been described as a bifurcated arm having a single ball joint pivotal connection to the body 42 and a double pivotal connection to the axle carrier 54. It is possible to employ a non-bifurcated arm that only has a single pivotal connection to the axle carrier 56 and FIGS. 7 and 8 show such an embodiment. In this embodiment, the single pivotal connection is elongated from the shorter split connections of the previously described embodiment. In all other regards, this embodiment is the same as those previously described and, for that reason, common reference numerals have been employed to identified common parts and further description is believed to be unnecessary.

Like the embodiment of FIGS. 1 through 4, it is also possible to vary the location which the suspension unit 67 is loaded to dampen the movement of the front wheel 44 and tire 43. FIGS. 9 through 17 show a variety of alternative mounting arrangements for the suspension units employing a construction of the basic type shown in FIGS. 7 and 8. Because of the incorporation of this suspension system, the alternate suspension unit locations can be shown in schematic views and FIGS. 9 through 17 are such schematic views. In these schematic views, components which are the same in function as those previously described have been identified by the same reference numerals for obvious reasons.

In the embodiment of FIG. 9, the suspension unit 67 is loaded between the lower arm 61 and an extension 101 of the upper arm so that the uspension unit 67 is positioned inboard of both the upper arm 56 and the axle carrier 53.

In the embodiment of FIG. 10, the suspension unit 67 is loaded between the upper arm 56 and the body 42 and specifically within a spring tower 102 formed in the body 42.

In the embodiments of FIGS. 9 and 10, like the embodiment of FIGS. 7 and 8, the line of action of the suspension unit 67 is substantially parallel to the steering axis 1.

In the embodiment of FIG. 11, the suspension unit 67 is disposed at an angle and is loaded between the lower arm 61 and the axle carrier 53.

Figure 12:
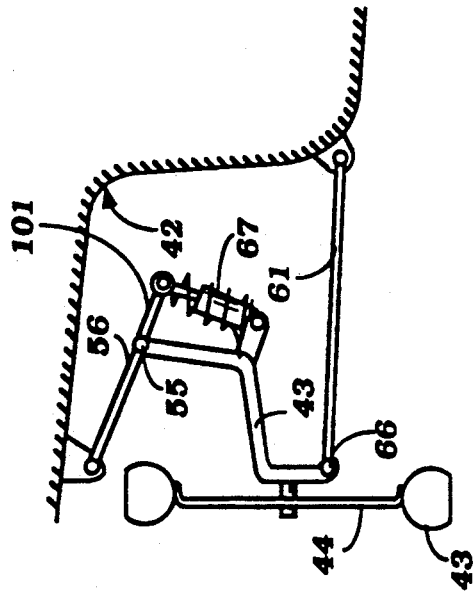
FIG. 12 is a schematic view, in part similar to FIGS. 9 through 11, showing a further embodiment of the invention.

The embodiment of FIG. 12 is similar to the embodiment of FIG. 9 in that the suspension unit 67 is loaded to an extension 101 of the upper arm 56. In this embodiment, however, the suspension element 67 reacts against the body 42 and specifically within a spring well 102 formed therein like the well 102 of the embodiment of FIG. 10.

Figure 13:
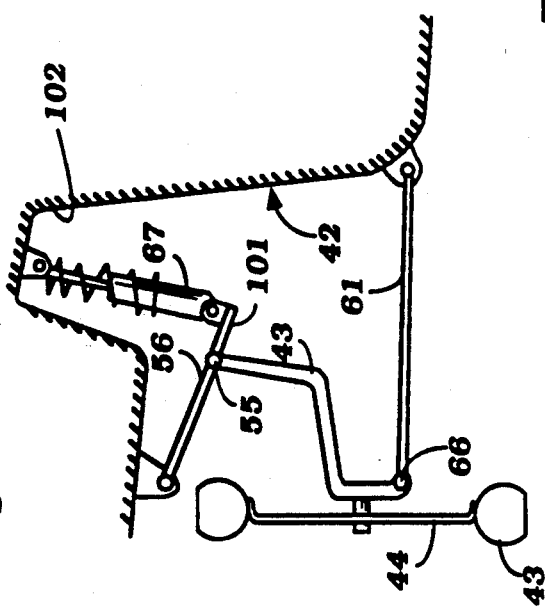
FIG. 13 is a schematic view, in part similar to FIGS. 9 through 12, and shows another embodiment of the invention.

The embodiment of FIG. 13 also employs an extension 101 of the upper arm 56 for loading the suspension unit 67. However, in this embodiment the suspension unit 67 is loaded between this upper arm extension 101 and the axle carrier 53.

Figure 14:
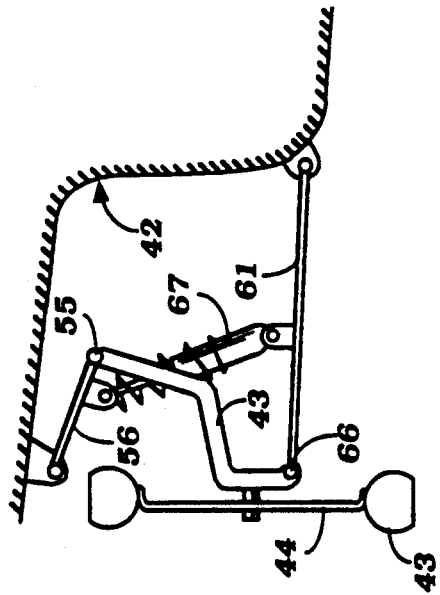
FIG. 14 is a schematic view, in part similar to FIGS. 9 through 13, and shows a still further embodiment.

FIG. 14 shows an embodiment wherein the suspension unit 67 is loaded between the lower arm 61 and the upper arm 56 between the opposite pivotal connections of both the lower and upper arms.

In the embodiment of FIG. 15, the suspension unit 67 is loaded between the axle carrier 43 and the upper arm 56. In this embodiment, the suspension unit 67 is located on the outboard side of the axle carrier 43.

FIG. 16 shows a similar embodiment but in this embodiment the suspension unit 67 is located directly between the outboard side of the axle carrier 43 and it loaded between the axle carrier 43 and the body 42.

The embodiment of FIG. 17 is similar to the embodiment of FIG. 16 in that the suspension unit 67 is loaded between the axle carrier 43 and the body 42. In this embodiment, however, the suspension unit 67 is located inboard of the axle carrier 43 rather than outboard as in the embodiment of FIG. 16.

Figure 18:
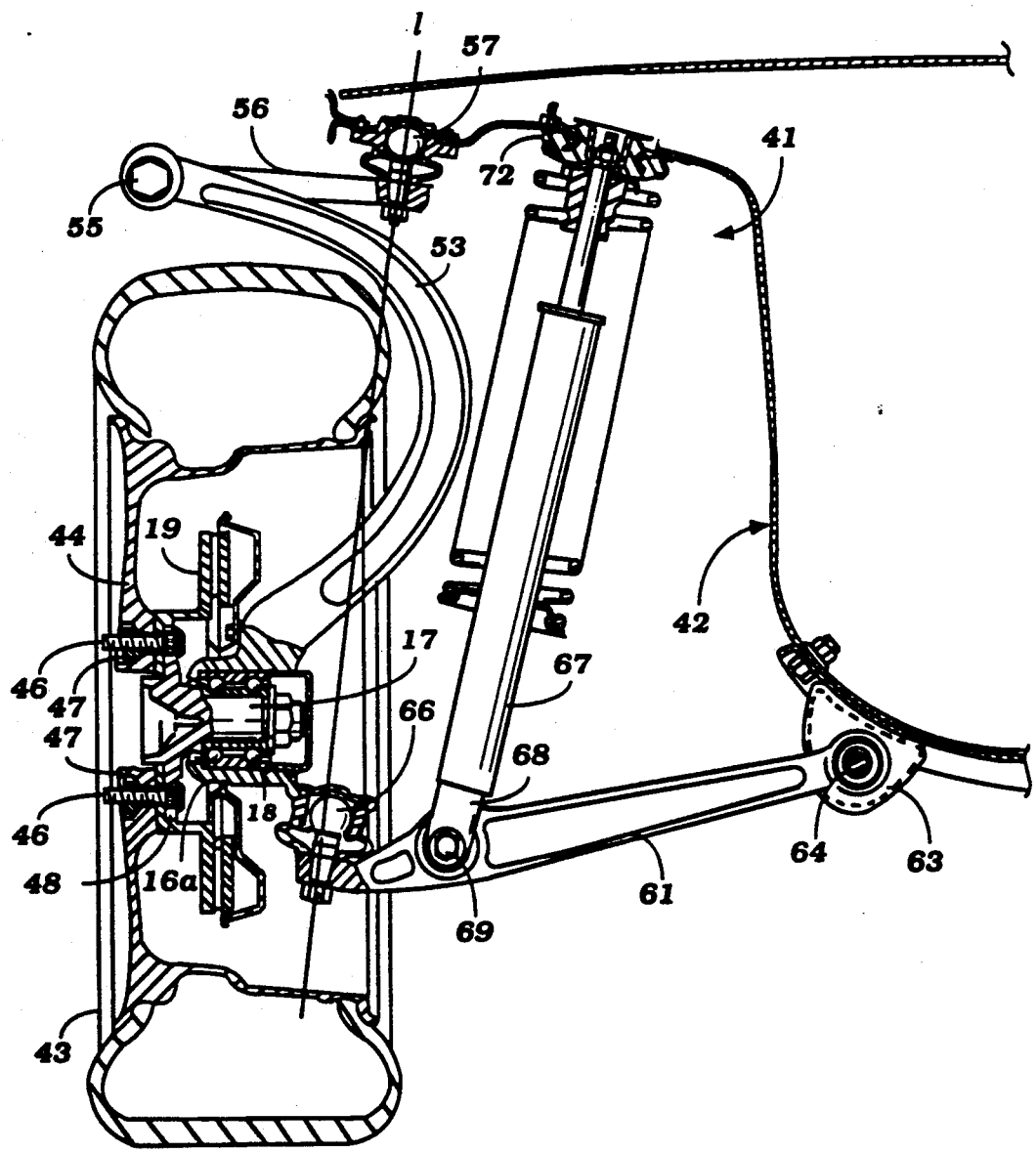
FIG. 18 is a cross sectional view, in part similar to FIGS. 1 and 7, and shown yet another embodiment of the invention.
Figure 19:
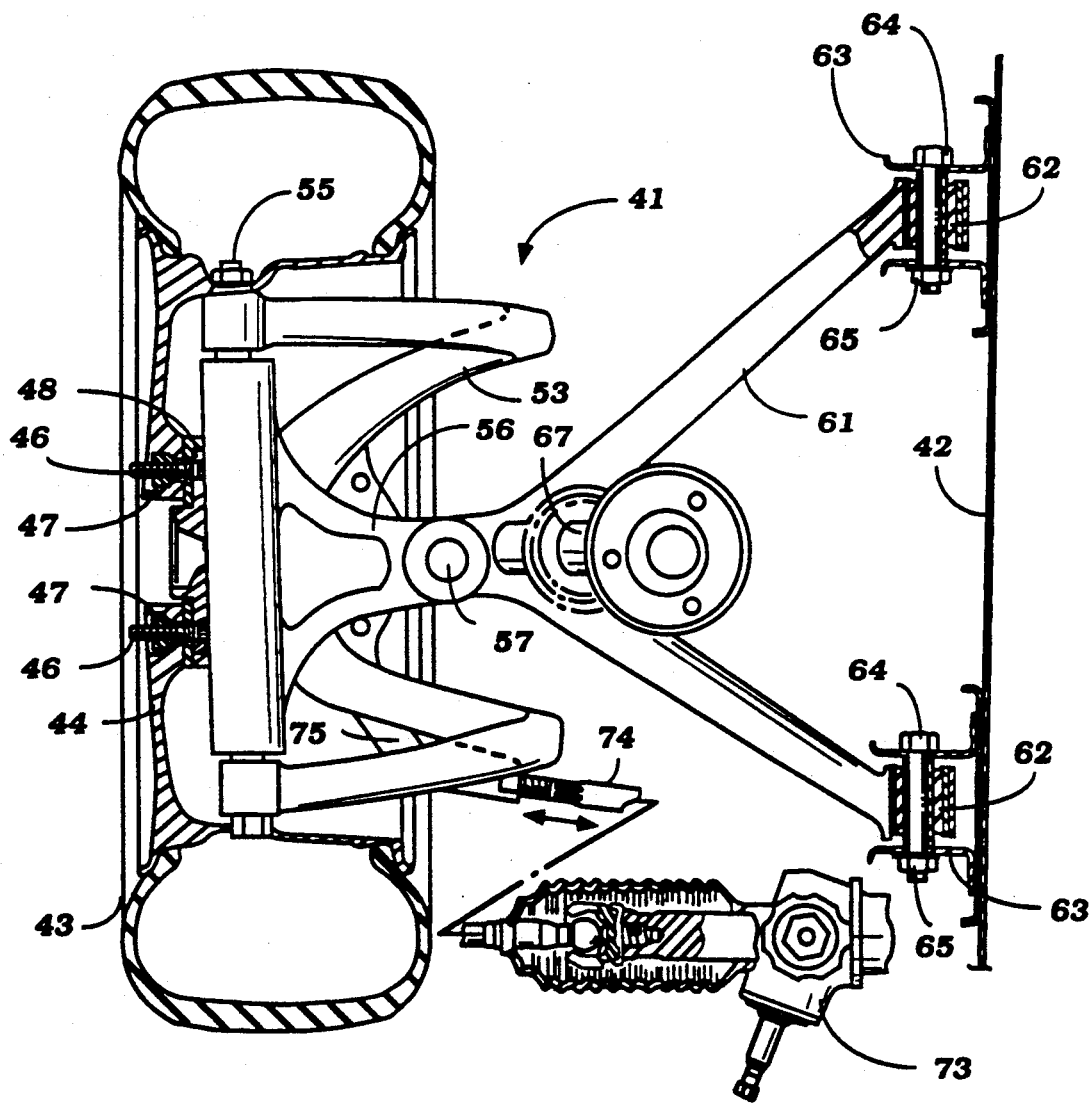
FIG. 19 is a top plan view of the embodiment of FIG. 18, with portions shown in section.

Description of the embodiments as thus far described, the upper arm 56 has been disposed so that its pivotal connection 57 to the body 42 is disposed outboard of its pivotal connection 55 to the axle carrier 54. FIGS. 18 and 19 show another embodiment of the invention which is generally the same as the previously described embodiments. In this embodiment, however, the upper arm 56, which is bifurcated like the embodiments of FIGS. 1 through 7 has the ball joint pivotal connection 56 inboard of the pivotal connection 55 to the axle carrier 53. As a result, the axle carrier 53 is provided with a curve portion as clearly shown in FIGS. 18 and 19 so that the pivotal connection 55 to the outboard end of the upper arm 56 actually lies above the front wheel and tire 44, 43. This construction also permits the use of a single pivot pin 55 for the connection to both ends of the upper arm 56 and the upper arm 56 can be elongated rather than bifurcated as clearly shown in FIG. 19. In all other regards this embodiment is the same as those previously described and has the same advantages thereof.

Like the embodiments of FIG. 1 through 4 and 7 and 8, a wide variety of locations are possible for the positioning and loading of the suspension unit 67 with the embodiment of FIGS. 18 and 19. FIGS. 20 through 29 show a variety of such alternative suspension unit positions. Like the embodiments of FIGS. 5 and 6 and 9 through 17, these alternate suspension unit locations can be understood by reference only to schematic views wherein the basic components are identified by the same reference numerals as previously employed and FIGS. 20 through 29 show a variety of such alternative suspension unit locations.

The embodiment of FIG. 20, the suspension unit 67 is loaded between the lower arm 61 and an extension 101 of the upper arm 56 so as to place it inboard of the axle carrier 3.

In the embodiment of FIG. 21, the suspension unit 67 is located in a spring well or tower 102 formed in the body 42 above the upper arm 56 and above the front wheel and tire 44, 43.

In the embodiment of FIG. 22, the suspension unit 67 is located inboard of the axle carrier 53 and is loaded between the axle carrier 53 and the lower arm 61.

Figure 23:
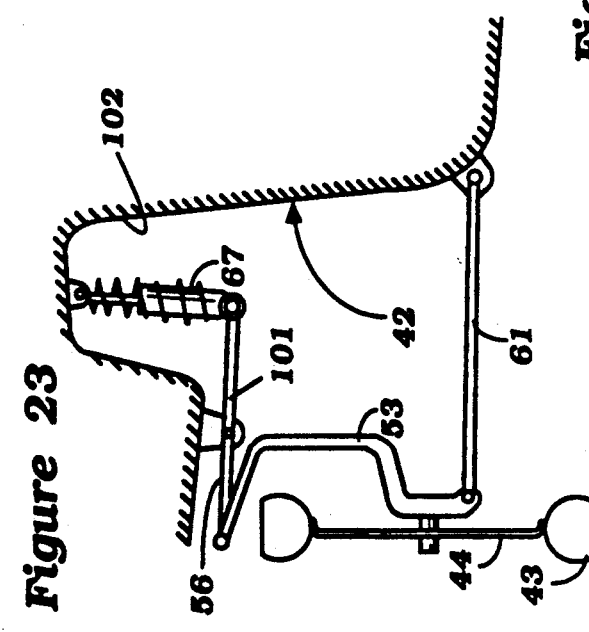
FIG. 23 is a schematic view, in part similar to FIGS. 20 through 22, and shows yet another embodiment of the invention.

In the embodiment of FIG. 23, the suspension unit 67 is located inboard and is loaded between and extension 101 of the upper arm 56 and the body 42. A spring tower 102 is provided for containing the suspension unit 67 in this embodiment.

Figure 24:
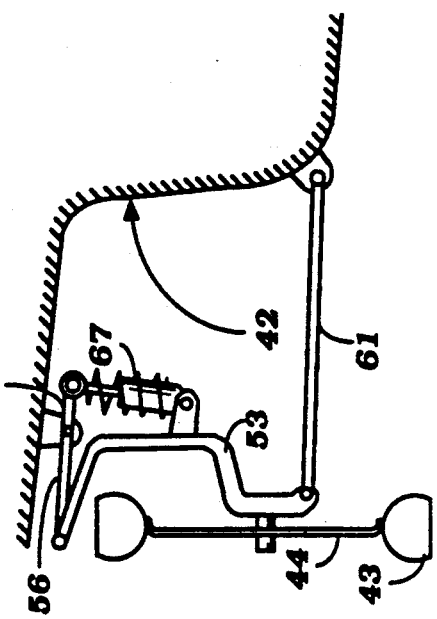
FIG. 24 is a schematic view, in part similar to FIGS. 20 through 23, showing yet another embodiment of the invention.

In the embodiment of FIG. 24, the suspension unit is loaded between an extension 101 of the upper arm 56 and the axle carrier 53 so as to be positioned inboard.

Figure 25:
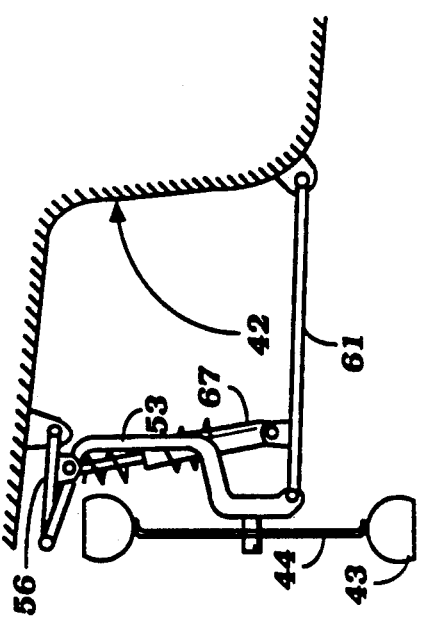
FIG. 25 is a schematic view, in part similar to FIGS. 20 through 24, showing a still further embodiment of the invention.

In the embodiment of FIG. 25, the suspension unit 67 is loaded between the upper arm 56 and the lower arm 61 but without any extension of the upper arm. As a result, the suspension unit crosses across the axle carrier 53 to accommodate this location.

Figure 26:
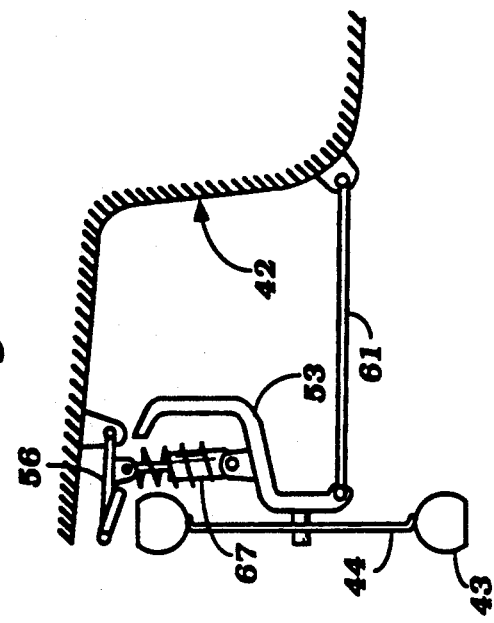
FIG. 26 is a schematic view, in part similar to FIGS. 20 through 25, and shows yet another embodiment of the invention.

In the embodiment of FIG. 26, the suspension unit 67 is positioned outboard of the axle carrier 53 and is loaded between the axle carrier 53 and the upper arm 56.

Figure 27:
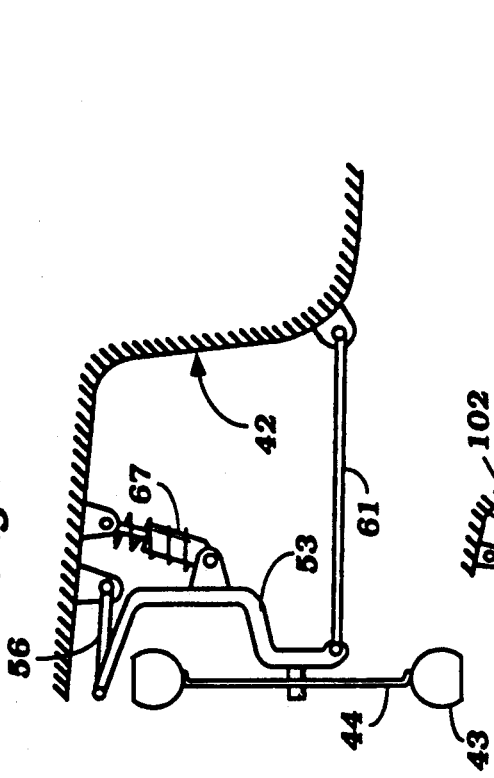
FIG. 27 is a schematic view, in part similar to FIGS. 20 through 26, and shows another embodiment of the invention.

In the embodiment of FIG. 27, the suspension unit 67 is positioned between the inboard side of the axle carrier 53 and is loaded between the axle carrier 53 and the body 42.

Figure 28:
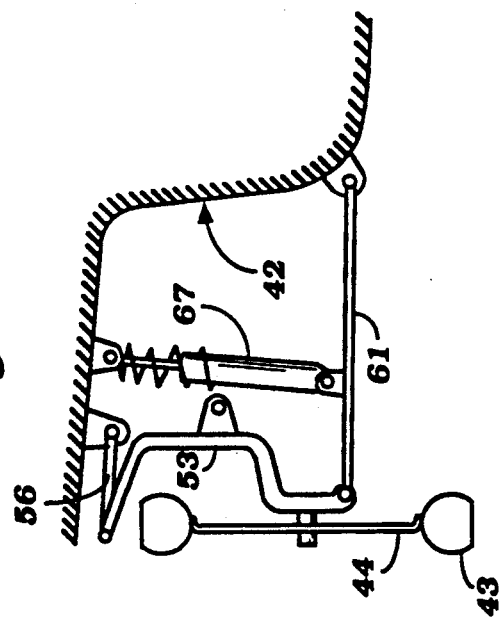
FIG. 28 is a schematic view, in part similar to FIGS. 20 through 27, and, shows yet another embodiment of the invention.

The embodiment of FIG. 28 loads the suspension unit 67 between the lower arm 61 and the body 42 and the suspension unit is positioned inboard of the axle carrier 53.

Figure 29:
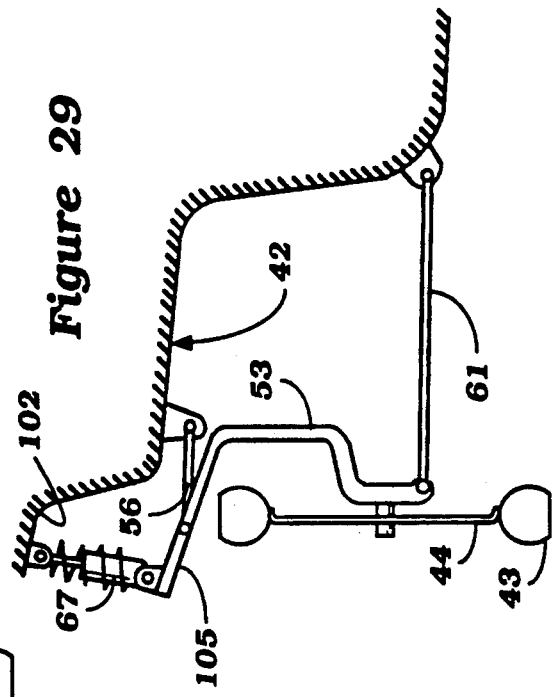
FIG. 29 is a schematic view, in part similar to FIGS. 20 through 28, and shows yet another embodiment of the invention.

In the embodiment of FIG. 29, the axle carrier 53 is provided with an extension 105 and the suspension unit 67 is loaded between this extension 105 and the body 42. A spring tower 102 is provided in the body 42 so as to enclose the suspension unit 67.

Figure 30:
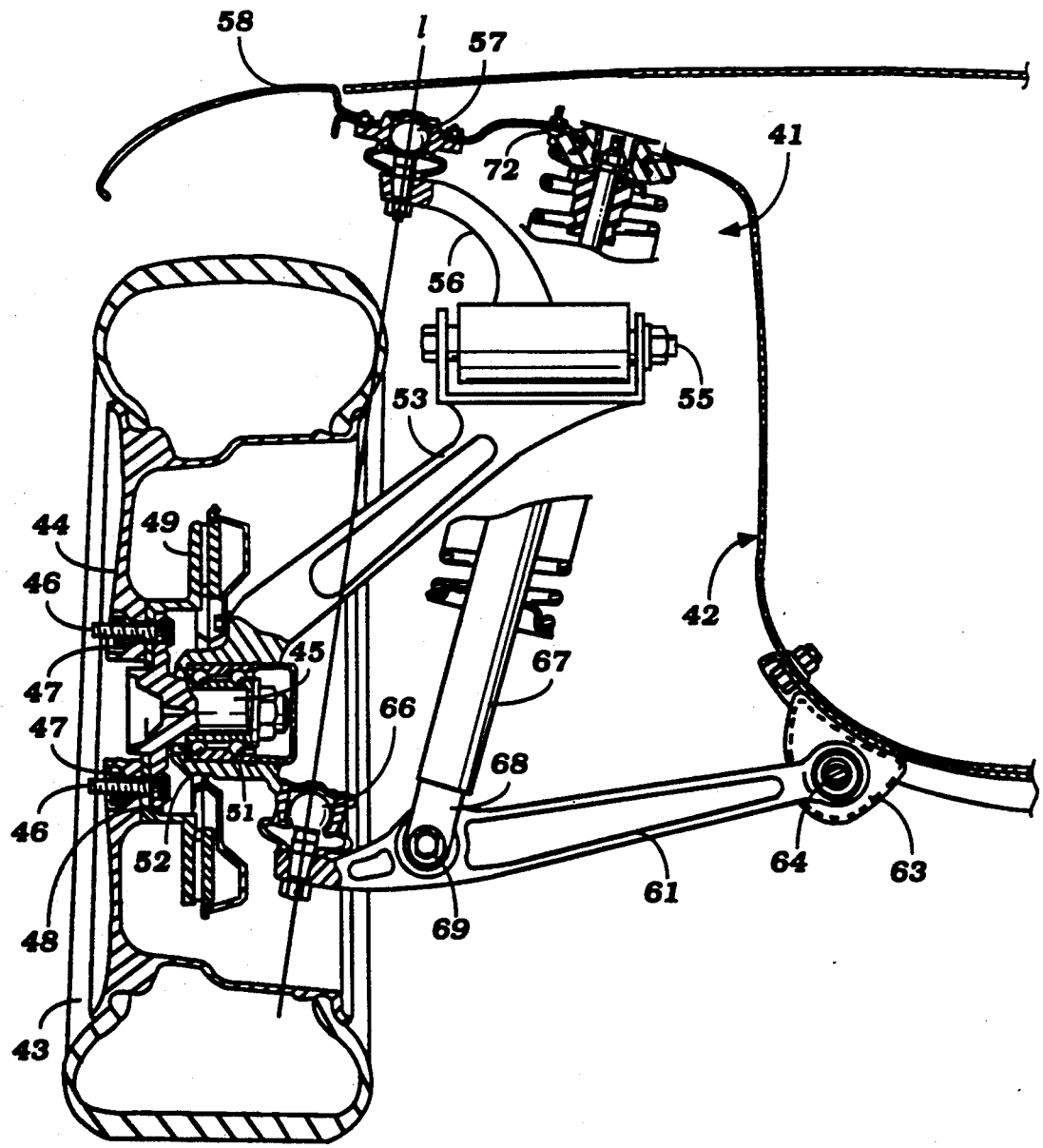
FIG. 30 is a cross section view, in part similar to FIGS. 1, 7 and 18 and shows a still further embodiment of the invention.
Figure 31:
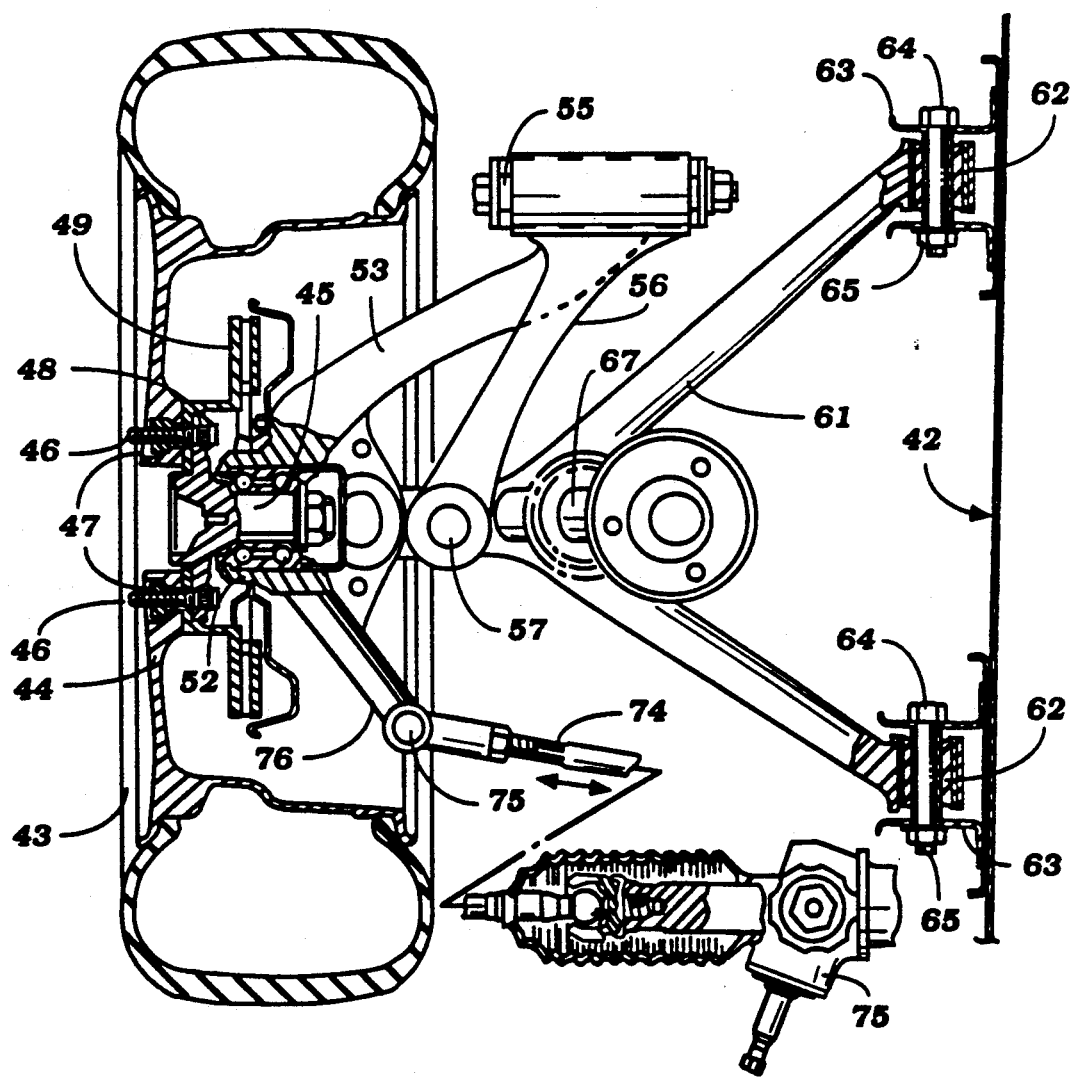
FIG. 31 is a top plan view, with portions shown in section, of the embodiment of FIG. 30.

The embodiments of the invention as thus far described, the pivotal connection 55 between the upper arm 56 and the axle carrier 53 has been disposed in a direction that extends generally parallel to the longitudinal axis of the associated vehicle when the front wheel 44 and tire 43 are in their straight ahead position. Of course, such a disposition is not essential and FIGS. 30 and 31 shown an embodiment which is similar to the embodiment of FIGS. 7 and 8 in that the upper arm 56 is not bifurcated. In this embodiment, however, the pivotal connection 55 between the axle carrier 53 and the inboard and of the upper arm 56 extends perpendicularly to the direction of the embodiment of FIG. 7 when the wheel 44 and tire 43 are in their straight ahead position. In all other regards this embodiment is the same as that of FIGS. 7 and 8 and, for that reason, the same reference numerals have been employed to identify the same components.

Figure 32:
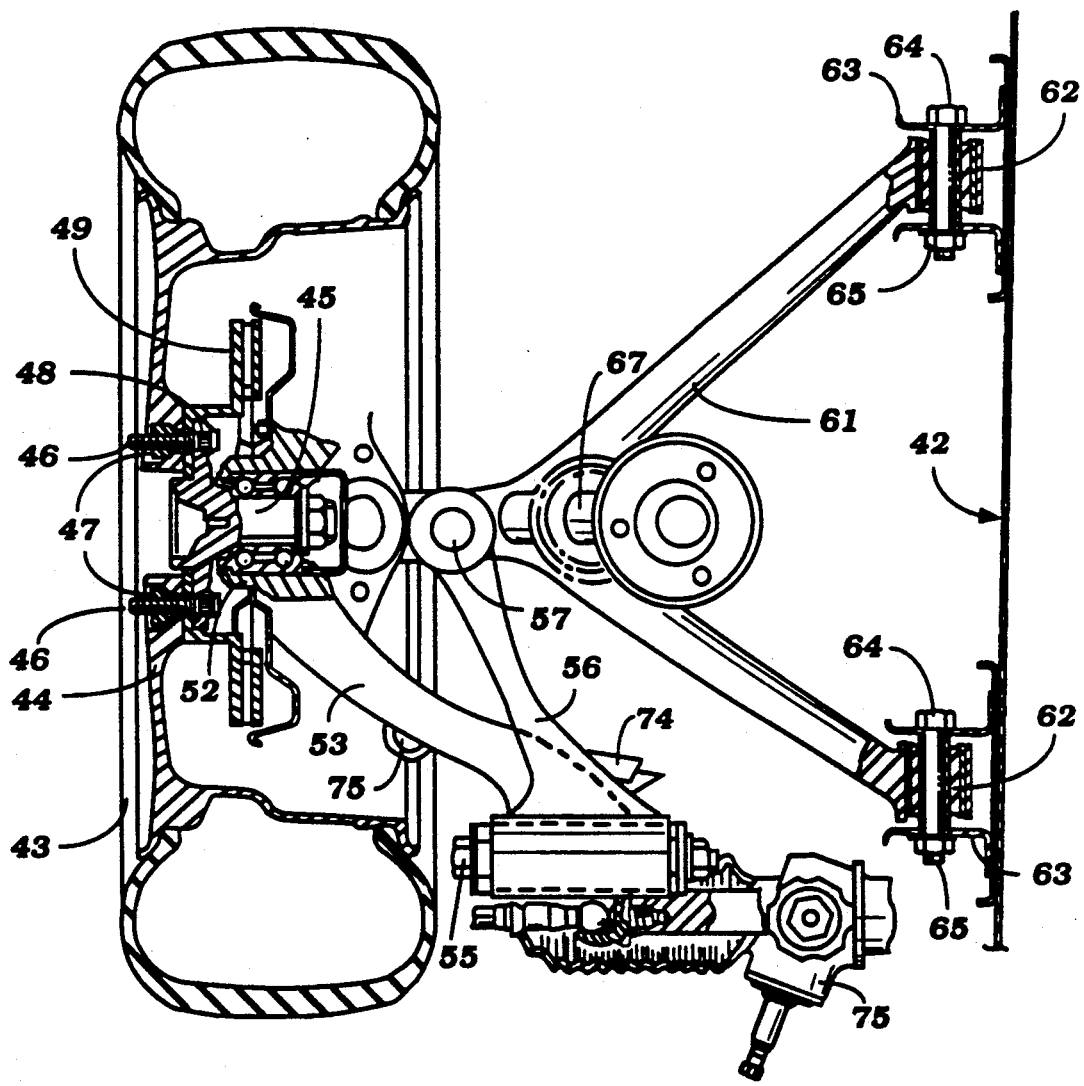
FIG. 32 is a top plan view, with portions shown in section, in part similar to FIG. 31, and shows a still further embodiment of the invention.
Figure 33:
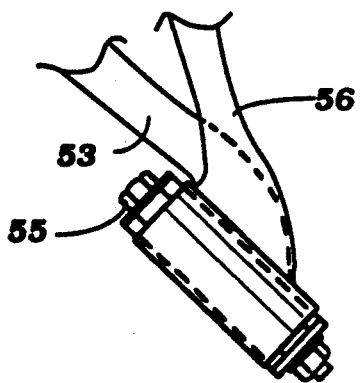
FIG. 33 is partial top plan view, in part similar to FIGS. 31 and 32, and shows yet another embodiment of the invention.
Figure 34:
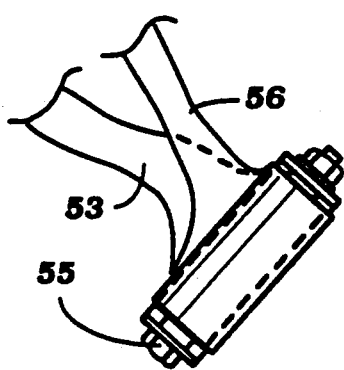
FIG. 34 is partial top plan view, in part similar to FIGS. 31 through 33, showing another embodiment of the invention.
Figure 35:
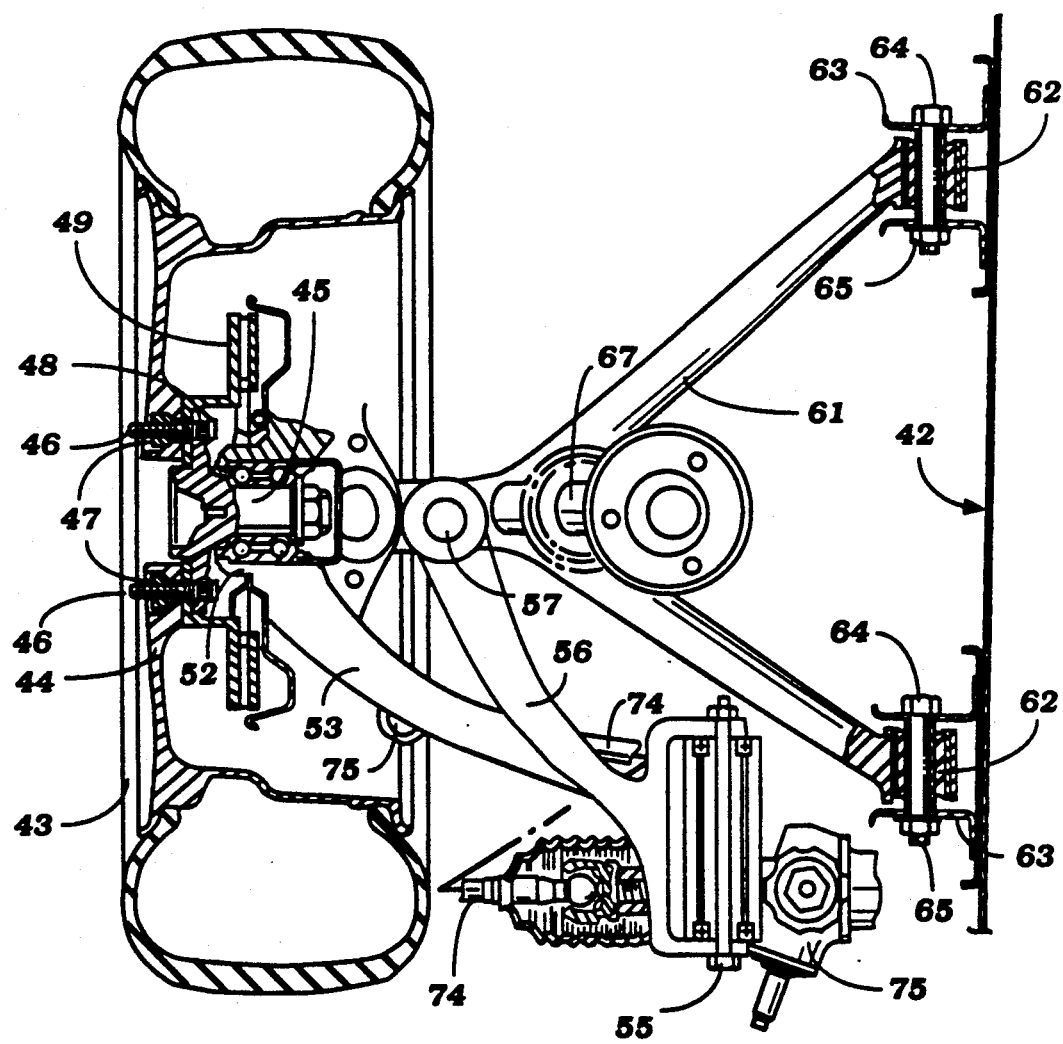
FIG. 35 is top plan view, in part similar to FIG. 8, and shows another embodiment.

In the embodiments of FIGS. 7 through 17 and FIGS. 30 and 31 the single non-bifurcated upper arm 53 has been disposed on the forward side of the front suspension system. FIGS. 32 through 35 show other embodiments of the invention that have generally the same relationships but wherein the single upper arm 53 is disposed on the rear side of the suspension. In the embodiment of FIG. 32, the pivotal connection 55 is in the same orientation as the embodiment of FIGS. 30 and 31, however, it is on the rear side of the front suspension rather than on the forward side. FIG. 35 shows an embodiment similar to FIGS. 7 and 8 but, again, the arm is to the rear rather than to the front. In all embodiments as thus far described the pivot axis 55 has been disposed either parallel to the longitudinal center line of the vehicle when the front wheel 44 and tire 43 are in their straight ahead position or perpendicular to it. In addition, various other relations are possible and FIGS. 33 and 34 show such other angular relationships.

In all other regards these embodiments are the same as those previously described and, for that reason, the same reference numerals have been employed to identify like characters in these embodiments.

FIG. 37 shows another embodiment of the invention that is similar to the embodiment of FIGS. 18 and 19. In those embodiments, the axle carrier 53 was generally bifurcated and had two spaced apart pivotal connections to the upper arm 56. FIG. 37 shows an embodiment which is generally the same but wherein the bifurcation of the axle carrier 53 is not required. In this embodiment, the pivotal axis 55 extends generally parallel to the longitudinal axis of the vehicle when the wheel 44 and tire 43 are in their straight ahead positions. Of course, various angular dispositions for the pivotal axis are also possible within the invention. FIGS. 37 and 38 show such alternative locations. In addition and is as with previously described embodiments, the single arm may be disposed rearwardly of the wheel axis rather than forwardly of it as shown in FIGS. 36 through 38 and at any desired angular relationship.

It should be readily apparent from the foregoing description that the embodiments of the inventions all provide a very compact and effective-independent suspension for a steered wheel in which the tread changes during suspension travel are substantially minimize. Of course, the previously described embodiments are those presently preferred and various changes and modifications may be made without departing from the spirit and scope of the invention, as defined by the appended claims.

I claim:

1. A suspension system for the dirigible wheel of a motor vehicle comprising an axle carrier for rotatably supporting said wheel about an axis, an upper arm having a pivotal connection to said axle carrier at one of its ends, first ball joint means for connecting the other end of said upper arm to said vehicle for pivotal suspension movement of said upper arm and for steering movement of said upper arm about a generally vertically extending steering axis, a lower arm pivotally connected to said vehicle at one end for suspension movement thereof, and second ball joint means for pivotally connecting the other end of said lower arm to said axle carrier for suspension and steering movement thereof.

2. A suspension system as set forth in claim 1 wherein the means for pivotally connecting the one end of the upper arm to the axle carrier comprises a pair of spaced apart axially aligned pin means.

3. A suspension system as set forth in claim 1 wherein the means for pivotally connecting the one end of the upper arm to the axle carrier comprises a single pin means.

4. A suspension system as set forth in claim 3 wherein the single pin means extends longitudinally of the vehicle when the wheel is in its straight ahead position.

5. A suspension system as set forth in claim 3 wherein the single pin means extends transversely to the longitudinal center line of the vehicle when the wheel in its straight ahead position.

6. A suspension system as set forth in claim 5 wherein the pin means extends perpendicularly to the longitudinal axis of the vehicle when the wheel is in its straight ahead position.

7. A suspension system as set forth in claim 1 wherein the first ball joint is spaced transversely from the longitudinal center line of the vehicle a greater distance than the pivotal connection of the other end of the upper ar to the axle carrier.

8. A suspension system as set forth in claim 7 wherein the means for pivotally connecting the one end of the upper arm to the axle carrier comprises a pair of spaced apart axially aligned pin means.

9. A suspension system as set forth in claim 7 wherein the means for pivotally connecting the one end of the upper arm to the axle carrier comprises a single pin means.

10. A suspension system as set forth in claim 9 wherein the single pin means extends longitudinally of the vehicle when the wheel is in its straight ahead position.

11. A suspension system as set forth in claim 9 wherein the single pin means extends transversely to the longitudinal center line of the vehicle when the wheel in its straight ahead position.

12. A suspension system as set forth in claim 11 wherein the pin means extends perpendicularly to the longitudinal axis of the vehicle when the wheel is in its straight ahead position.

13. A suspension system as set forth in claim 1 wherein the first ball joint means is positioned transversely closer to the longitudinal center line of the vehicle than the pivotal connection between the other end of the upper arm and the axle carrier.

14. A suspension system as set forth in claim 13 wherein the pivotal connection between the other end of the upper arm and the axle carrier lies substantially over the wheel.

15. A suspension system as set forth in claim 14 wherein the means for pivotally connecting the one end of the upper arm to the axle carrier comprises a pair of spaced apart axially aligned pin means.

16. A suspension system as set forth in claim 14 wherein the means for pivotally connecting the one end of the upper arm to the axle carrier comprises a single pin means.

17. A suspension system as set forth in claim 16 wherein the single pin means extends longitudinally of the vehicle when the wheel is in its straight ahead position.

18. A suspension system as set forth in claim 16 wherein the single pin means extends transversely to the longitudinal center line of the vehicle when the wheel in its straight ahead position.

19. A suspension system as set forth in claim 18 wherein the pin means extends perpendicularly to the longitudinal axis of the vehicle when the wheel is in its straight ahead position.

20. A suspension system as set forth in claim 1 further including a suspension unit loaded between one of the arms and the vehicle.

21. A suspension system as set forth in claim 20 wherein the suspension unit is loaded between the lower arm and the vehicle.

22. A suspension system as set forth in claim 21 wherein the suspension unit is located inboard of the upper arm.

23. A suspension system as set forth in claim 20 wherein the suspension unit is loaded between the upper arm and the vehicle.

24. A suspension system as set forth in claim 23 wherein the suspension unit is loaded between an extension of the upper arm and the vehicle and the connection of the suspension unit to the upper arm is spaced from the ball joint and the pivotal connection to the axle carrier.

25. A suspension system as set forth in claim 23 wherein the suspension unit is loaded between the ends of the upper arm and the vehicle.

26. A suspension system as set forth in claim 1 further including a suspension unit loaded between the axle carrier and the vehicle.

27. A suspension system as set forth in claim 1 further including a suspension unit loaded between the arms.

28. A suspension system as set forth in claim 27 wherein the suspension unit is loaded between the lower arm and an extension of the upper arm.

29. A suspension system as set forth in claim 27 wherein the suspension unit is loaded between the ends of the lower arm and the upper arm.

30. A suspension system as set forth in claim 1 wherein the upper and lower ball joints are co-axial with the steering axis.

31. A suspension system as set forth in claim 1 further including a suspension unit loaded between the axle carrier and one of the arms.

32. A suspension system as set forth in claim 31 wherein the suspension unit is loaded between the axle carrier and the upper arm.

33. A suspension system as set forth in claim 31 wherein the suspension unit is loaded between the axle carrier and the lower arm.

* * * * *